United States Patent [19]

Evans et al.

[11] Patent Number: 4,823,896
[45] Date of Patent: Apr. 25, 1989

[54] CYLINDER ATTACHMENT FOR ELEVATING TRANSPORTER

[75] Inventors: John G. Evans, Binbrook; Bogdan Charczuk, Smithville, both of Canada

[73] Assignee: Paling Spring Limited, Hamilton, Canada

[21] Appl. No.: 82,596

[22] Filed: Aug. 7, 1987

[30] Foreign Application Priority Data

Jun. 12, 1987 [CA] Canada ................................. 539500

[51] Int. Cl.⁴ .......................................... B62D 61/10
[52] U.S. Cl. ................................... 180/24.01; 280/96.1
[58] Field of Search ............. 180/22, 24, 24.01, 24.02; 280/96.1, 660, 673, 674, 704; 403/124, 234, 236, 150, 154, 157; 384/206, 208

[56] References Cited

U.S. PATENT DOCUMENTS

| | | | |
|---|---|---|---|
| 1,810,423 | 6/1931 | Hatch | 403/154 |
| 3,001,796 | 9/1961 | Martin | 280/43.18 |
| 3,689,102 | 9/1972 | Granning | 280/112 |
| 3,743,044 | 7/1973 | Scheele | 180/24.01 |
| 3,794,344 | 2/1974 | Raidel | 280/124 |
| 3,903,979 | 9/1975 | Perrotin | 180/24.01 |
| 4,043,403 | 8/1977 | Anderson et al. | 280/43.23 |
| 4,102,424 | 7/1978 | Heinze | 280/43.18 |
| 4,147,448 | 4/1979 | Jeffery | 404/124 |
| 4,161,325 | 7/1979 | Schneider | 180/24.02 |
| 4,166,639 | 9/1979 | Taylor | 280/704 |
| 4,195,856 | 4/1980 | Larson et al. | 280/81 |
| 4,293,145 | 10/1981 | Taylor | 280/704 |
| 4,417,634 | 11/1983 | Quaeck et al. | 180/22 |

FOREIGN PATENT DOCUMENTS 803392 1/1969 Canada ............................. 180/24.01

OTHER PUBLICATIONS

Paling Drawing No. A3047A illustrating Lower Turntable Support Used in CTEC Elevating Transporter, the drawing being dated Jul. 14, 1986.
Paling Drawing entitled Kenworth Suspension Center Bearing dated Aug. 13, 1986, illustrating Trunnion Assembly Found in 1971 Kenworth Truck.
Four color photographs illustrating known suspension torque arm used on large truck tractor predating the present invention by several years.

Primary Examiner—Charles A. Marmor
Assistant Examiner—Ross Weaver
Attorney, Agent, or Firm—Wegner & Bretschneider

[57] ABSTRACT

A retractable undercarriage for mounting dual wheels for a large transport vehicle comprising a support member adapted for connection to the vehicle and having a vertically extending leg and an arm member pivotally connected to one end thereof to the lower end of the leg by a special pin connection employing ring bearings. A running gear sub-assembly is connected to the other end of the arm member. First and second mounting blocks are respectively attached to an upper portion of the support member and to the arm member. Each of these blocks has a slot formed therein for receiving a pivot pin, which slot is open at one end. A hydraulic cylinder mechanism extends and retracts the undercarriage by pivoting the arm member. The upper and lower ends of this mechanism are pivotally connected by the pivot pins to the mounting blocks. Threaded fasteners secure the pivot pins in their respective slots. Bolt holes for these fasteners are formed in opposite end sections of the pivot pins and extend diametrically of the pins.

24 Claims, 7 Drawing Sheets

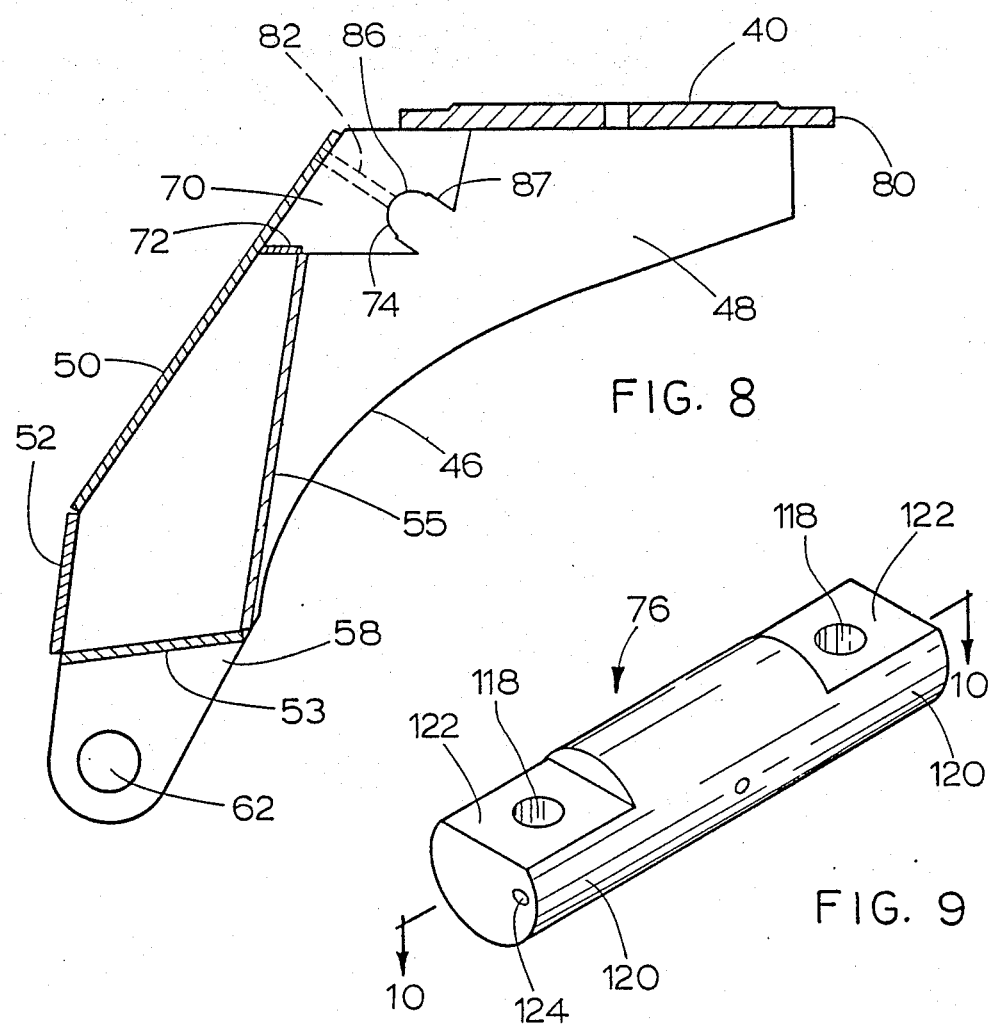
FIG. 8
FIG. 9
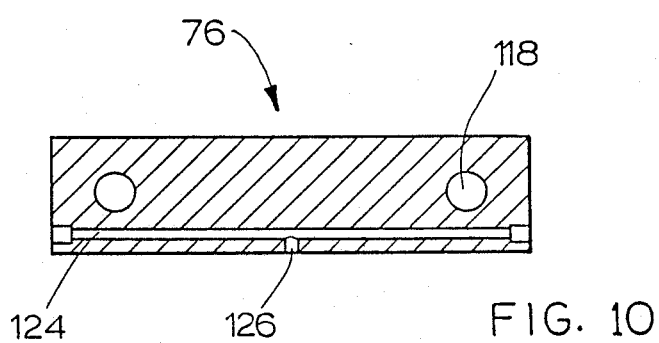
FIG. 10

CYLINDER ATTACHMENT FOR ELEVATING TRANSPORTER

BACKGROUND OF THE INVENTION

This invention relates to undercarriages for mounting dual wheels, particularly undercarriages suitable for large transport vehicles.

In order to save handling costs, large transport vehicles have been developed that are capable of loading themselves quickly. One such known vehicle is manufactured by CTEC Corporation of Bellevue, Wash. This vehicle has eight lines of axles with the centre two lines acting as driving axles which do not steer. The remaining lines of axles are divided into pairs of half axles and they are used to steer the vehicle as well as to carry the load. Each half axle consists of a short axle on which a set of dual wheels is mounted. Each half axle or short axle is mounted on a retractable undercarriage that has its own individual turntable for steering purposes. A hydraulic cylinder mechanism is able to lower or raise each set of dual wheels relative to the mainframe of the vehicle for loading purposes. With the wheels in a raised or retracted position, the vehicle can be backed under an elevated loading ramp on which the intended cargo has been placed. By extending the wheels and thereby raising the load carrying surface of the vehicle, this surface can be brought into contact with the load to be transported. Once the vehicle has lifted the load from the loading platform, it can then be driven away with its wheels still in the extended or lower position.

Difficulties have been encountered in maintaining and servicing these vehicles which are fairly expensive. One difficulty that has arisen concerns the pivot pins used to mount the hydraulic cylinder mechanism which is used to extend or retract each set of dual wheels. With the known means for mounting these pivot pins which are quite large because of the loads that they must carry, the pins tend to jam or seize in their mounting blocks and this makes the pins considerably difficult to remove.

Another difficulty with the known retractable undercarriage is the knee-joint connection between the arm on which the dual wheels are mounted and the vertical leg of the undercarriage to which the arm is connected at its front end. The known vehicles employ a simple pin-type connection and a spherical thrust bearing between each arm and its respective vertical leg. It will be appreciated this joint is under considerable stress for several reasons including the fact that these vehicles are intended to carry large heavy loads and the joint must also be capable of turning its respective dual wheels in order to steer the vehicle. The known knee-joints in the CTEC vehicles have been subject to premature bearing failure and weldment failure in the arm on which the dual wheels are mounted. The spherical bearings that are used are not designed to take radial loads.

U.S. Pat. No. 3,001,796 issued Sept. 26, 1961 to the Gerstenslager Company describes a retractable undercarriage for a truck trailer, which undercarriage employs a hydraulic cylinder and plunger rod that lower or raise the rear wheels of the trailer. The undercarriage has an arcuate locking channel and a running gear subassembly connected to the trailer frame. The running gear assembly is rotatably mounted about the axis of a pivot tube which is disposed between the trailer frame and an outer skirt of the vehicle. A standard clevis pin attaches the top of the hydraulic cylinder to a clevis while the outer end of the plunger rod is connected to a mounting bracket by another standard pin held by cotter pins.

U.S. Pat. No. 4,195,856 issued Apr. 1, 1982 to Oshkosh Truck Corporation, describes a high-lift tag axle for a concrete mixing vehicle. The tag axle is pivoted by means of a generally L-shaped beam which is connected at its forward end to a hydraulic cylinder mechanism that extends generally horizontally. The front and closed end of the hydraulic cylinder is mounted on a short shaft with an expanded head about which a mounting ring of the cylinder is arranged. The shaft is carried by a mounting plate bolted to the vehicle frame. A bolt forms a pivot pin for the outer end of the plunger rod. This bolt is supported in a conventional spherical bearing assembly and is held in place by a nut.

It is an object of this invention to provide a reliable retractable undercarriage for dual wheels that is inexpensive and easier to maintain.

It is a further object of this invention to provide an undercarriage for dual wheels that is suitable for a vehicle carrying heavy loads and that is less likely to break or fail.

SUMMARY OF THE INVENTION

According to one aspect of the present invention, a retractable undercarriage for wheels for a large vehicle includes a support member adapted for connection to a frame of the vehicle and having a vertically extending portion and an arm member pivotally connected at one end thereof to the lower end of the vertically extending portion. There are provided means for mounting a set of dual wheels on the other end of the arm member, the mounting means including an axle arrangement. A first mounting block attached to the support member is adapted to receive a first pivot pin and a second mounting block rigidly attached to the arm member and spaced from the one end of the arm member is adapted to receive a second pivot pin. There is provided hydraulic cylinder means for extending and retracting the undercarriage by pivoting the arm member, an upper end of the cylinder means being pivotally connected by the first pivot pin to the first mounting block and a lower end of the cylinder means being pivotally connected by the second pivot pin to the second mounting block. Threaded fasteners secure at least one of the first and second pivot pins to its respective mounting block. At least one of the first and second mounting blocks has a slot formed therein for receiving its respective pivot pin, the slot being open at one end, and the threaded fasteners are used to secure the pivot pin in this slot.

According to another aspect of the present invention, a retractable undercarriage for dual wheels of a large vehicle includes a rigid support member adapted for connection to and support of a main frame of the vehicle and having a vertically extending leg and an arm member pivotally connected at one end thereof to the lower end of the leg. There are provided pin means for pivotally connecting the arm member to the rigid support member, the pin means including a pin member extending through openings in both the support member and the arm member, an inner tubular member extending around a central section of the pin member, and two spaced-apart inner bearing rings mounted on the tubular member. Each of these rings has an outer surface that is convex in an axial cross-section. Two spaced-apart outer bearing rings are arranged around their respective inner bearing rings and each has an inner surface that is concave so as to form a mating bearing surface with the convex surface. An outer tubular member has these bearing rings and the pin member arranged therein and is rigidly arranged in the one end of the arm member. The undercarriage also includes means for sealing off the bearing rings to protect them from dirt and other contaminants and a running gear sub-assembly connected to and mounted on the other end of the arm member, this sub-assembly including an axle arrangement for mounting dual wheels. There are also means for extending and retracting the undercarriage by pivoting the arm member relative to the support member.

According to a further aspect of the invention, an undercarriage for dual wheels of a vehicle includes support means adapted for connection to and support of a main frame of the vehicle, this support means including an elongate frame member extending in use in the direction of travel of the vehicle. Two spaced apart support brackets extend up from one end of the frame member and each has a hole formed therein. Pin means pivotally connect an axle arrangement for the dual wheels on this frame member and are supported at opposite ends thereof by the support brackets. The pin means include a pin member that extends through the holes in the brackets, a inner tubular member extending around a central section of the pin member, two spaced-apart inner bearing rings mounted on the tubular member and each having an outer surface that is convex in axial cross-section, and two spaced-apart outer bearing rings arranged around their respective inner bearing rings. The outer rings have an inner surface that is concave and forms a mating bearing surface with the convex surface. There is also an outer tubular member in which the bearing rings and pin member are arranged and the axle arrangement is mounted on this tubular member. Means are provided to seal off the bearing rings to protect them from dirt and other contaminants.

In a preferred embodiment of the undercarriage, the rigid support member has a round, horizontal upper surface forming a turntable support for the vehicle and this arrangement permits the dual wheels mounted on the undercarriage to be steered.

The preferred sealing means comprises two seal rings mounted in opposite ends of the outer tubular member and extending around the perimeter of the inner tubular member.

Further features and advantages will be apparent from the following detailed description taken in conjunction with the accompanying drawings.

BRIEF DESCRIPTION OF THE DRAWINGS

FIG. 8 is a cross-sectional view of the support member taken along the line 8—8 of FIG. 7;

FIG. 9 is a perspective view of a pivot pin used in the retractable undercarriage;

FIG. 10 is a cross-sectional view of the pivot pin of FIG. 9 taken along the line 10—10;

DETAILED DESCRIPTION OF PREFERRED EMBODIMENTS

Figure 1:
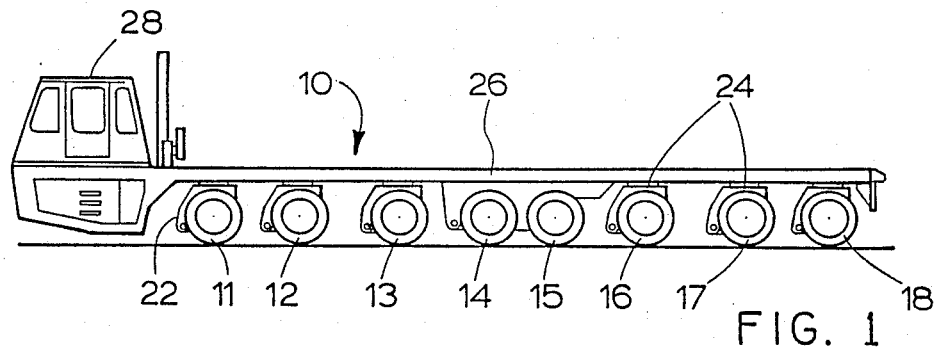
FIG. 1 is a schematic elevational plan view of a transport vehicle employing the present invention.
Figure 2:
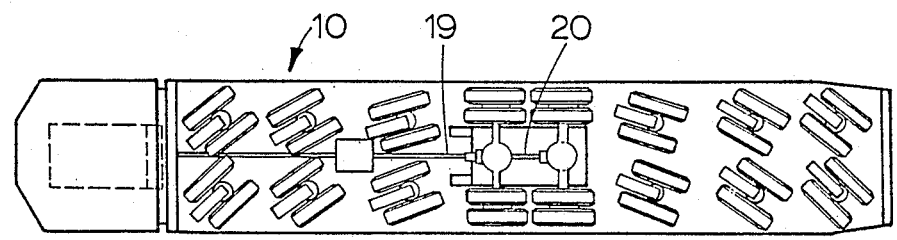
FIG. 2 is a schematic bottom view of the vehicle of FIG. 1.

FIGS. 1 and 2 illustrate a type of vehicle that is known and that is used to transport heavy loads such a rolls of steel. The vehicle 10 can be the type manufactured by CTEC Transport Systems of Bellevue, Wash. This vehicle has eight lines of axles indicated at 11 to 18 in FIG. 2. The center two lines of axles 14 and 15 are driving axles as indicated by the drive shafts 19 and 20 shown in dashed lines in FIG. 1. The driving axles to not steer but they help to carry the load and they supply the tractive effort to propel the vehicle. The vehicle is steered by the other axle lines 11 to 13 and 16 to 18 as indicated by the outline of the wheels in FIG. 1. Each of these steering axle lines has two sets of dual wheels with each set being mounted on a short axle. Each of these short axles is mounted on a special retractable undercarriage 22 whose construction is shown in greater detail in FIGS. 5 and 6. Each steerable undercarriage is bolted to a turntable 24 of known construction at the top so that the dual wheels turn around the center vertical axis of this turntable. By means of this turntable the undercarriage 22 is pivotally connected to the mainframe 26 of the vehicle. Arranged at the front of the vehicle 10 is a cab or enclosure 28 for the operator of the vehicle.

Figure 3:
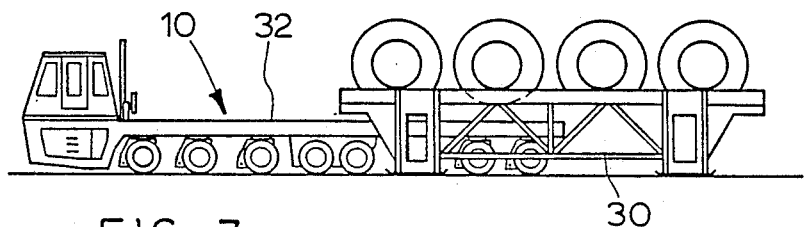
FIG. 3 is a schematic illustration of the manner in which this vehicle can be used to load and transport large rolls of steel.
Figure 4:
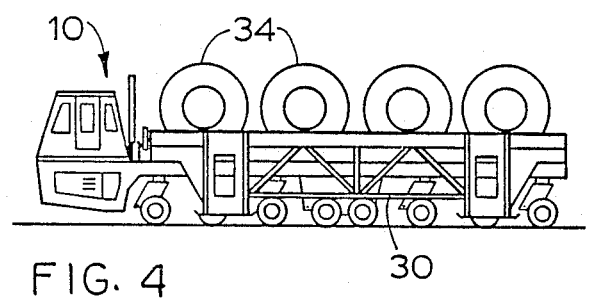
FIG. 4 is a schematic illustration similar to FIG. 3 but showing the vehicle in the elevated position with the loading platform and steel rolls on the deck of the vehicle.
Figure 5:
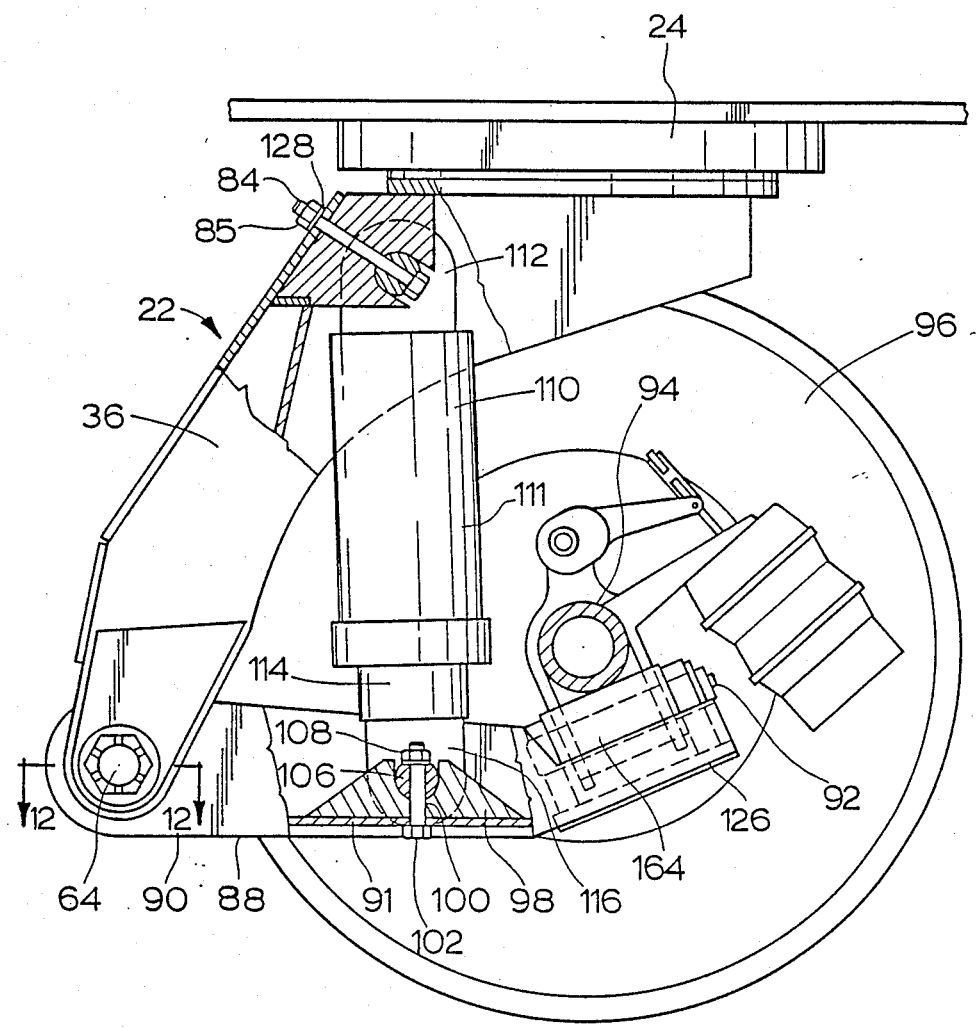
FIG. 5 is a side elevation of a retractable undercarriage for the vehicle of FIGS. 1 and 2 which undercarriage can be steered.
Figure 6:
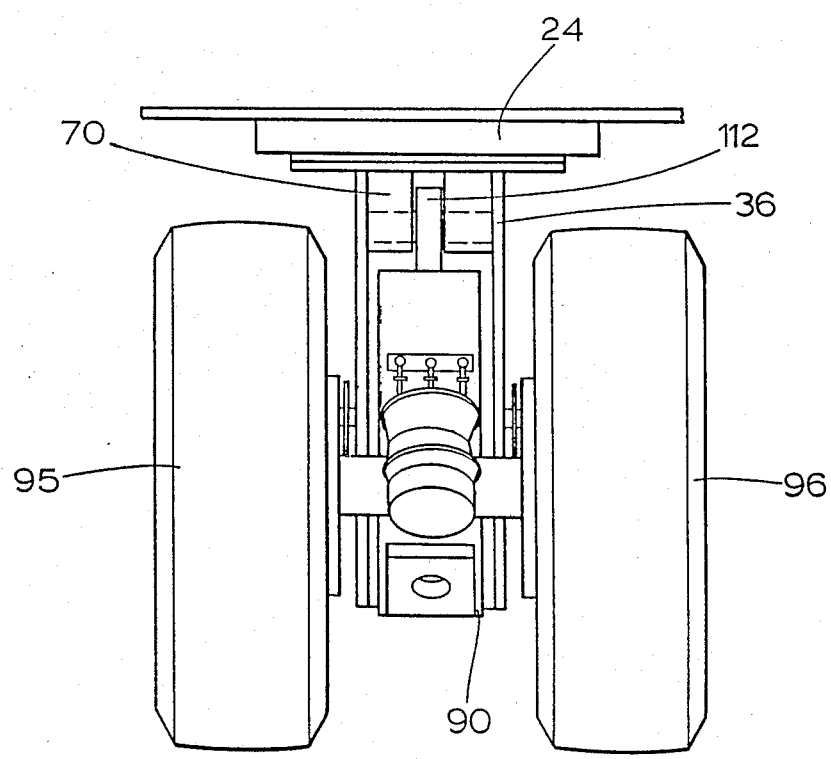
FIG. 6 is a rear view of the retractable undercarriage of FIG. 5 showing dual wheels mounted thereon.

This known vehicle 10 is self-loading as illustrated in FIGS. 3 and 4. The vehicle is intended for use in association with a suitable loading platform 30 under which the vehicle can be backed as shown in FIG. 3. Prior to loading the vehicle 10 is in its lowered position. This is accomplished by retracting all of the undercarriages for both the driving and steering wheels by means of hydraulic cylinders, one of which is shown in FIG. 5. Once the vehicle has been backed under the platform 30 so that its load bed 32 is directly below the platform and the items to be transported (in the illustration these comprise steel rolls 34), the vehicle is elevated as shown in FIG. 4 so that its load bed comes into contact with the platform 30. In this way the platform rests on the load bed of the vehicle and the vehicle then drives forward with the platform 30 and the articles thereon. As explained above problems have been encountered with the retractable undercarriages of this known vehicle and the present invention seeks to alleviate these problems by improvements in the construction of the undercarriages, both those used to drive the vehicle and those used to steer it.

Figure 7:
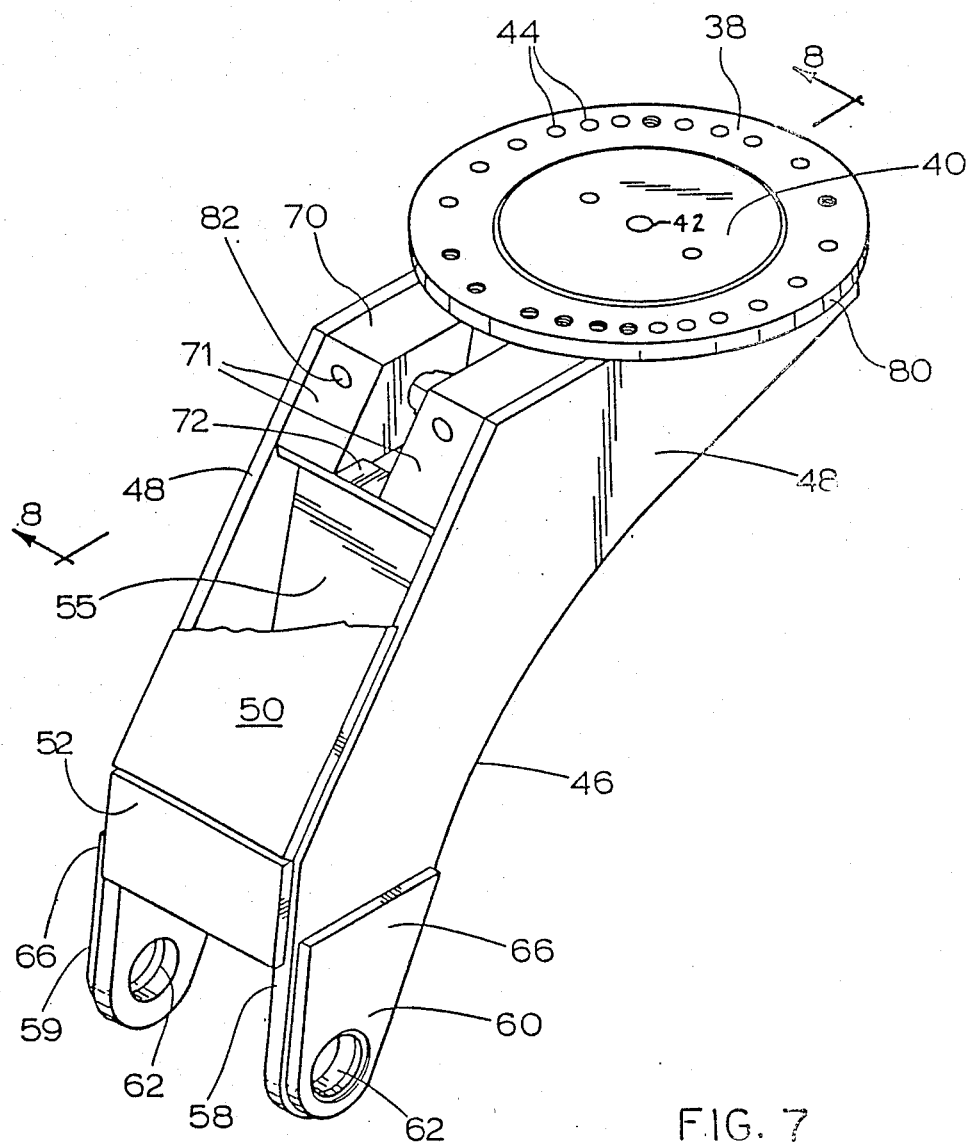
FIG. 7 is a perspective view of a rigid support member used in the undercarriage of FIGS. 5 and 6.
Figure 11:
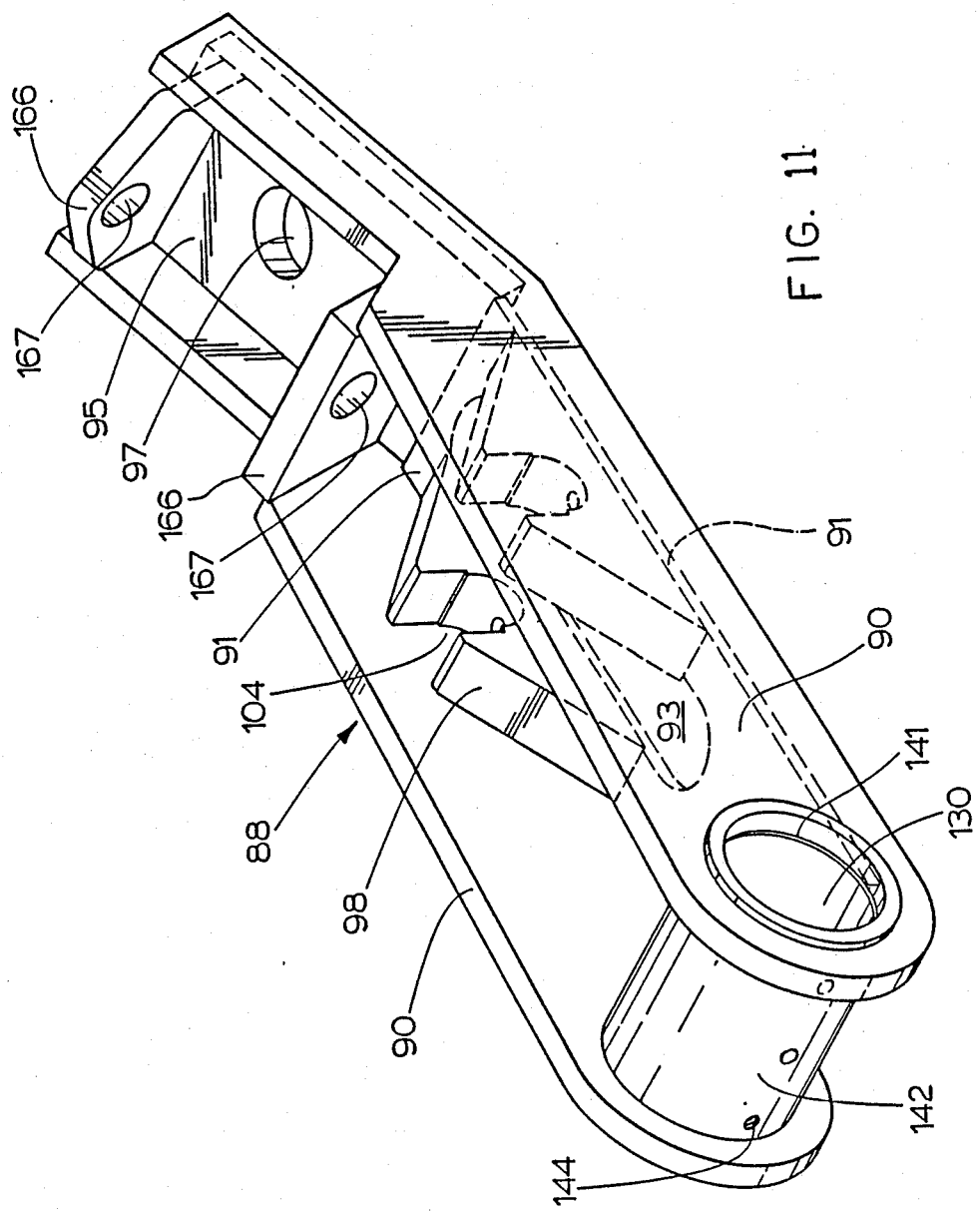
FIG. 11 is a perspective view of the arm member that is pivotally connected to the support member of FIGS. 7 and 8.

Turning now to the retractable, steerable undercarriage shown in FIG. 5, this undercarriage 22 includes a rigid support member 36 adapted for connection to and support of the mainframe 26 of the vehicle. In a known manner the upper section of the support member 36 is detachably connected to the aforementioned turntable 24 about the center of which the undercarriage can pivot. The construction of the turntable need not be described herein as it forms no part of the present invention and is of known construction. The support member 36 has a round, horizontal upper surface 38 shown clearly in FIG. 7. This upper surface has a circular raised center section 40 with a hole 42 formed in the center thereof for a hydraulic hose (not shown). Distributed around the perimeter of this upper section are a total of twenty-four bolt holes 44 and these are used to connect the support member to the turntable.

Extending down from the upper section of the support member in a generally vertical direction is the leg 46. Both the leg 46 and the upper section of the support member are formed by two parallel, spaced-apart steel plates 48, typically one inch thick. These plates are connected together along their front edges by a flat, rectangular plate 50 and a smaller rectangular plate 52. There is also a small rectangular plate 53 interconnecting the plates 48 and located near the bottom thereof and a larger interconnecting plate 55 extending upwardly from the plate 53. The interconnecting plates are typically half inch thick steel plate.

The lower end of the leg 46 is bifurcated at 58 so as to form two branches 59 and 60 at its lower end. Each of these branches has an opening 62 to receive an outer end section of a pin member 64 shown in FIG. 5 and in greater detail in FIG. 12. Preferably each branch of the leg is reinforced or strengthened by an outer steel plate 66, typically one half inch thick.

A first mounting block 70 is rigidly attached to the upper portion of the support member 36. The mounting block 70 actually comprises two separate spaced-apart sections 71 formed from solid steel that are typically $3\frac{3}{4}$ inches thick. Located between the two sections and connecting same is a short flat plate 72 that is located at the top end of the plate 55. Each section of the block has a slot 74 formed therein for receiving a pivot pin 76 the construction of which is shown in detail in FIGS. 9 and 10. The forward surface of each section 71 rests against the connecting plate 50 while the upper surface rests in part against the top plate 80 that forms the upper surface 38. Drilled through each section of the block 70 is a bolt hole 82 which in a preferred embodiment is 13/16 inch in diameter in order to accomodate a $\frac{3}{4}$ inch bolt 84. The bolt 84 is used to fasten a pivot pin for the top end of the hydraulic cylinder as described further hereinafter. It is secured in place by a nut 85 shown in FIG. 5. The slot 74 formed in each section has a semi-cylindrical closed end 86 which in one preferred embodiment has a diameter of about 2.5 inches. The open end of the slot and the straight sided portion 87 has a slightly wider dimension that in the same preferred embodiment measures 2 and $\frac{5}{8}$ inches across.

Pivotally connected to the lower end of the leg 46 is an arm member 88. The member 88 is connected by means of the aforementioned pin member 64. The arm member comprises two parallel, spaced-apart steel plates 90 that are connected together near their bottom edges by elongate rectangular plate 91 having an elongate hole 93 formed therein. At the forward end of each plate 90 is a circular hole to accomodate the pin member 64 in a manner shown in detail in FIG. 12. A running gear sub-assembly 92 is connected to and mounted on the other end of the arm member 88. This sub-assembly includes an axle arrangement 94 for mounting dual wheels 95 and 96. Except for the yoke bearing arrangement described in detail hereinafter, this running gear sub-assembly 92 is of known construction and therefore a detailed description thereof is deemed unnecessary. Another connecting plate 95 with an access hole 97 therein joins the plates 90 at the rear end of the arm member.

Mounted between the two plates 90 and on top of the interconnecting plate 91 is a mounting block 98 used to connect the piston rod of the hydraulic cylinder mechanism. Like the upper mounting block already described, the lower block 98 comprises two spaced-apart sections, each of which is connected to a respective one of the plates 90. Each section has a bolt hole drilled therein to accomodate a connecting bolt 102. Each section of the block is formed with a slot 104 for receiving a pivot pin 106, similar in its construction to that shown in FIGS. 9 and 10. In one preferred embodiment this pin has a diameter of approximately 2.5 inches and a length of 6 and $\frac{7}{8}$ inches. The bolts 102 used to fasten the pin can be $\frac{3}{4}$ inch bolts and they are secured in place by nuts 108.

Hydraulic cylinder means 110 are used to extend and retract the undercarriage 22 by pivoting the arm member 88 about the pin member 64. The hydraulic cylinder means includes hydraulic cylinder 111 that is connected at the top by a connecting lug 112. The aforementioned pivot pin 76 extends through a circular hole in the lug 112 to connect the lug to the mounting block 70. The hydraulic cylinder mechanism also includes hydraulic piston 114 which has a lug portion 116 formed at the bottom end. The pivot pin 106 extends through a hole in this lug portion in order to connect the piston to the mounting block 98. Hydraulic hoses (not shown) are of course connected to the cylinder means 110 in a known manner for the operation thereof.

The construction of the pivot pin 76 will now be described with reference to FIGS. 9 and 10. The pin has two bolt holes 118 formed in opposite end sections 120 thereof. Each hole 118 extends diametrically through the pin as shown clearly in FIG. 10. Each end section 120 is flat on one side as indicated at 122. It will be understood that one of the threaded fasteners or bolts 84 engages the flat side of each end section 120. Preferably in order that the pin can be properly greased, a longitudinally extending hole 124 is drilled through the length of the pin. There is also a short passage 126 extending outwardly from the hole 124 at the center thereof to permit grease to pass outwardly to the exterior of the pin. Both ends of the hole 124 are preferably tapped to permit the attachment of grease fittings.

The orientation of the slots 74 and 104 should be noted. The slot 74 is inclined rearwardly and downwardly as shown in FIGS. 5 and 8 so that its open end 75 faces towards the other end 126 of the arm member and the running gear sub-assembly 92. Preferably the slot 74 and the holes 82 extending therefrom are oriented so that the attachment nuts 85 will press squarely against the sloping plate 50 via washers 128. The slot 104 in the preferred embodiment has its open end facing upwards when the arm member 88 is extending horizontally. In this way the heads of the bolts 102 via suitable washers press squarely against the connecting plate 91.

Figure 12:
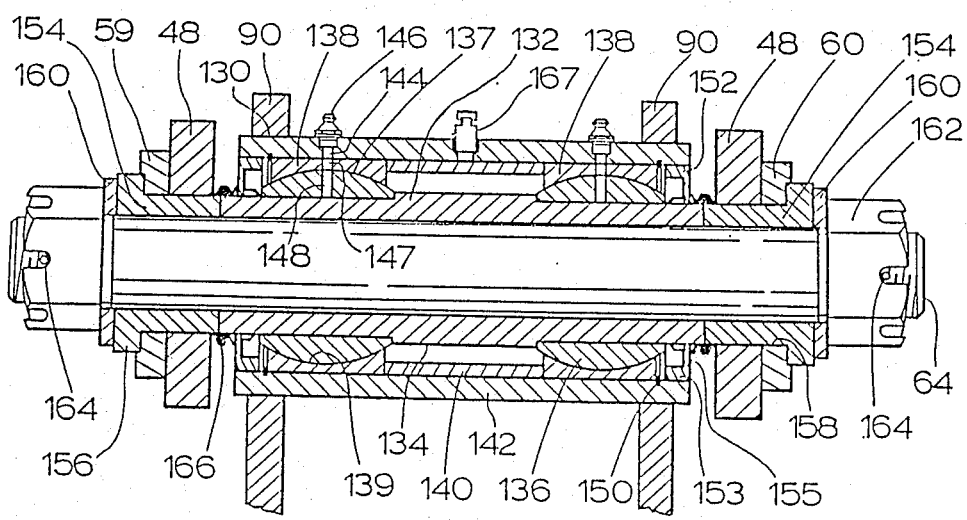
FIG. 12 is a cross-sectional view of the pivot pin mechanism for the knee joint of the undercarriage shown in FIG. 5.

The pin means for the knuckle joint or knee joint arrangement, which pin means includes the aforementioned pin member 64 will now be described with particular reference to FIG. 12. The pin member 64 extends through openings in the two steel plates 48 that form the sides of the leg 46 and through circular openings 130 formed in the two steel plates 90 that form the sides of the arm member 88. The pin means include an inner tubular member 132 having internal diameter corresponding approximately to the diameter of pin member 64 (a sliding fit). A central section 134 has an outside diameter slightly greater than the outside diameter of the remainder of the tubular member. Mounted on the tubular member are two spaced-apart inner bearing rings 136, each of which has an outer surface 137 that is convex in the axial cross-section shown in FIG. 12. Two spaced-apart outer bearing rings 138 are arranged around the exterior of their respective inner bearing rings and each has an inner surface 139 that is concave so as to form a mating bearing surface with the convex surface. The outer bearing rings are held apart by a cylindrical spacer 140. This "floating" cylindrical spacer has a clearance fit about its exterior and is able to transfer loads and stresses from one bearing to the other. The inner rings 136 are held apart by the aforementioned central section 134 of the inner tubular member. Extending around the outside of the bearing rings is an outer tubular member 142 whose outside diameter is equal to the diameter of the openings 130 in the plates 90. The outer tubular member, which is shown in FIG. 12, is rigidly connected to the plates 90 such as by welding. At a suitable location in the member 142 two holes 144 are drilled and tapped to accomodate two grease fittings or nipples 146. By means of holes 147 drilled through the outer bearing rings, grease is able to pass to the convex and concave bearing surface and to grooves 148 formed on the exterior of the inner bearing rings. It will be understood that the aforementioned inner and outer rings form two spherical bearings which permit not only the pivotal movement of the arm member 88 about the horizontal axis extending through pin member 64 but also permit some bending or flexing of the pin member 64 and the surrounding tubular member in order to accomodate the loads and forces acting thereon and to help prevent failure of this knee joint.

In the knee joint, means are provided to seal off the bearing rings 136 and 138 to protect them from dirt and other contaminants and to retain the grease. The sealing means are located axially outwardly from a circular retainer ring 150 that is positioned against the outside radial surface of each other ring 138. This retainer ring extends into a groove formed in the inner surface of the tubular member 142 and it holds the outer ring in place. The seal means comprises two seal rings 152, one at each end of the tubular member 142. These lip seals could, for example, be Garlock, Model #53-2192. Each seal ring has a generally U-shaped cross-section and it has a flexible rubberlike material on the inner side thereof in order to accomodate the pivotal movement of the joint. The outer portions at 153 and 155 of these seals are made of steel. These seals are held in place by a press fit between the portion 153 and tubular member 142.

The pin means further includes two steel adaptors 154, each of which extends through a respective one of the steel plates 48. The inner end of each adaptor rests against one end of the inner tubular member 132. Each adaptor is provided with a radially outwardly extending flange 156 at one end and this flange rests against the outside surface of the plate 60. The adaptor 154 fits snugly in the opening 158 formed in the plates 48 and 60 and does not rotate. Each adaptor is held in place by a large washer 160 and an adjacent castle nut 162. The nut 162 is threaded onto the end of the pin 64 and is prevented from rotating thereon by a cotter pin 164. The tightening of the castle nuts prevents rotation of the pin member 64 relative to the plates 48.

A flexible rubber V-ring is fitted between the inside surface of each branch of the leg 46 and the seal ring 152. This elastomeric V-ring is a standard type that can be obtained from SKF of Sweden. Each V-ring 166 extends about the exterior of an end of the inner tubular member 154 and helps the sealing action by providing a double seal. Each elastomeric V-ring is held in place by being stretched and then released to contract into its correct position. Preferably a pressure release valve is provided at 167 to prevent undue buildup of pressure in the joint upon lubrication.

From the above description it will be seen that a very strong, yet flexible connection is provided between the arm member and the downwardly extending leg of its support member. This joint is able to withstand the considerable forces on this knee joint, which forces result from a variety of loads including the tremendous weight of the vehicle itself when loaded. In an undercarriage for dual wheels used to steer the vehicle, the joint must be capable of withstanding the turning forces that must be passed through this joint in order to steer the dual wheels.

Figure 13:
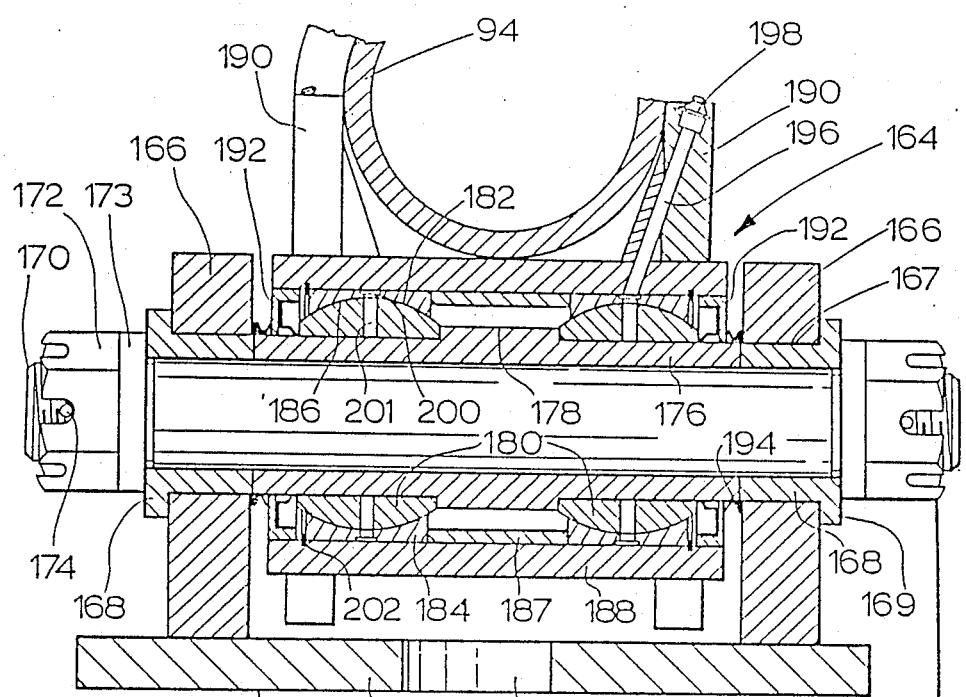
FIG. 13 is an axial cross-section of the yoke bearing arrangement used in the undercarriage of FIG. 5.

In FIG. 13 of the drawings there is shown the yoke bearing arrangement which is used to connect the axle arrangement 94 to the rear end of the arm member 88. The yoke bearing arrangement 164 is mounted on two bracket members 166 that are welded to the rear end of the arm member 88 and that have circular apertures 167 formed therein. Mounted in this aperture is a steel adaptor 168 having a radially extending flange 169 at one end. These adaptors do not rotate and are held in place by torque applied to the nuts and the pin. Extending through the two adaptors is a pin member 170 that is threaded at each end to receive castle nuts 172. A washer 173 is provided between each castle nut and the adjacent adaptor 168. Each castle nut is held in place by a cotter pin 174.

The yoke bearing arrangement comprises pin means for pivotally connecting the axle arrangement 94 for the dual wheels on the arm member or frame member 88. It will be understood that the yoke bearing is necessary to permit the dual wheel to tilt from side to side to some extent to accomodate uneven ground over which the wheels may be moving. The pin means that form the yoke bearing arrangement include an inner tubular member 176 having a central section 178 of slightly greater external diameter than the remainder of the member. This tubular member 176 extends between the two steel adaptors 168 and extends around a central section of the pin member 170 (this is a sliding fit). Two spaced-apart inner bearing rings 180 are mounted on the tubular member 176 on opposite sides of the central section 178. Each has an outer surface 182 that is convex in axial cross-section. There are also two spaced-apart outer bearing rings or retainer rings 184 arranged around their respective inner rings and each having an inner surface 186 that is concave and forms a mating bearing surface with the convex surface. The outer rings 184 are held apart a fixed distance by a cylindrical spacer 187. This "floating" cylindrical spacer has a clearance fit about its exterior and bearings. Surrounding the outer rings is an outer tubular member 188 to which the axle arrangement is connected by suitable brackets 190.

Means are provided for sealing off the bearing rings in order to protect them from dirt and other contaminants and to retain grease around these rings. The sealing means comprise two lip seals 192, one at each end of the outer tubular member 188. These steel and rubber seals can by Type 45-455655 and are similar in their construction to those used in the knee joint arrangement of FIG. 12. As shown on FIG. 13, the seals 192 extend around the perimeter of the inner tubular member 176. Flexible elastomeric V-rings 194 are fitted between the inside surfaces of the support brackets 166 and seals 192. Each V-ring 194 extends around the perimeter of an end of the inner tubular member and helps the sealing action by providing a double seal.

In order to provide grease to the two spherical bearings formed by the inner and outer rings, a hole 196 extends through each of the brackets 190 and through the outer tubular member. Each hole 196 is drilled to receive a grease nipple 198. Each hole 196 opens into a grease passageway 200 extending through the center of the outer ring 184 to a groove 201 formed in the outer surface of the inner ring. There is also a pressure release valve (not shown) similar to the valve 167 described earlier for the knee joint.

Finally retainer rings 202 are used to hold the outer rings 184 in place, the rings extending into grooves formed in the outer tubular member.

It will thus be seen that a very strong yet flexible yoke bearing arrangement is provided for the retractable undercarriage, one that is able to withstand the heavy loads carried by the vehicles that employ these undercarriages. The inner tubular member 176 is able to flex or bend along its longitudinal axis together with the pin member 170 and because of this, the likelihood of failure of the arrangement is reduced.

It will be clear to those skilled in this art that various modifications and changes can be made to the preferred undercarriage described herein without departing from the spirit and scope of this invention. All such modifications and changes as fall within the scope of the appended claims are intended to form part of this invention.

We claim:

1. A retractable undercarriage for dual wheels for a large vehicle comprising:
   a support member adapted for connection to and support of said vehicle and having a vertically extending leg;
   an arm member pivotally connected at one end thereof to the lower end of said leg by a pin connection;
   a running gear sub-assembly connected to and mounted on the other end of said arm member, said sub-assembly including an axle arrangement for mounting dual wheels;
   a first mounting block rigidly attached to an upper portion of said support member and having a slot formed therein for receiving a pivot pin and open at one end;
   a second mounting block rigidly attached to said arm member and spaced from said one end of the arm member, said second block also having a slot formed therein for receiving a pivot pin and open at one end;
   hydraulic cylinder means for extending and retracting said undercarriage by pivoting said arm member, an upper end of said cylinder means being pivotally connected by a first pivot pin to said first mounting block and a lower end of said cylinder means being pivotally connected by a second pivot pin to said second mounting block;
   a first pair of threaded fasteners for securing said first pivot pin in said slot of said first mounting block; and
   a second pair of threaded fasteners for securing said second pivot pin in said slot of said second mounting block.

2. A retractable undercarriage according to claim 1 wherein each of said first and second pivot pins have two bolt holes formed in opposite end sections thereof and extending diametrically of the pin and said threaded fasteners extend through their respective bolt holes.

3. A retractable undercarriage for dual wheels for a large vehicle comprising:
   a support member adapted for connection to and support of said vehicle and having a vertically extending leg;
   an arm member pivotally connected at one end thereof to the lower end of said leg by a pin connection;
   a running gear sub-assembly connected to and mounted on the other end of said arm member, said sub-assembly including an axle arrangement for mounting dual wheels;
   a first mounting block rigidly attached to an upper portion of said support member and having a slot formed therein for receiving a pivot pin and open at one end;
   a second mounting block rigidly attached to said arm member and spaced from said one end of the arm member, said second block also having a slot formed therein from receiving a pivot pin and open at one end;
   hydraulic cylinder means for extending and retracting said undercarriage by pivoting said arm member, an upper end of said cylinder means being pivotally connected by a first generally cylindrical pivot pin to said first mounting block and a lower end of said cylinder means is pivotally connected by a second generally cylindrical pivot pin to said second mounting block, each of said pivot pins having an end section at each end that is flat on one side and two bolt holes formed in opposite end sections thereof and extending diametrically of the pin;
   a first pair of threaded fasteners extending through the bolt holes in said first pivot pin for securing same in said slot of said first mounting block; and
   a second pair of threaded fasteners extending through the bolt holes in said second pivot pin for securing same in said slot of said second mounting block;
   wherein one of said bolt holes opens into the flat side of each end section and one of said threaded fasteners engages the flat side of each of said end sections.

4. A retractable undercarriage according to claim 2, wherein said slot in said first mounting block is inclined rearwardly and downwardly so that its open end faces towards said other end of said arm member and the running gear sub-assembly.

5. A retractable undercarriage according to claim 1, wherein said slot in said first mounting block is inclined rearwardly and downwardly so that its open end faces towards said other end of said arm member and the running gear sub-assembly and said slot in said second mounting block has its open end facing upwards when said arm member is extending horizontally.

6. A retractable undercarriage for wheels for a large vehicle comprising:
a support member adapted for connection to a frame of said vehicle and having a vertically extending portion, an arm member pivotally connected at one end thereof to the lower end of said vertically extending portion;
means for mounting a set of dual wheels on the other end of said arm member, said mounting means including an axle arrangement;
a first mounting block rigidly attached to said support member and adapted to receive a first pivot pin;
a second mounting block rigidly attached to said arm member and spaced from said one end of the arm member and adapted to receive a second pivot pin;
hydraulic cylinder means for extending and retracting said undercarriage by pivoting said arm member, an upper end of said cylinder means being pivotally connected by said first pivot pin to said first mounting block and a lower end of said cylinder means being pivotally connected by said second pivot pin to said second mounting block; and
threaded fasteners for securing at least one of said first and second pivot pins to its respective mounting block, wherein at least one of said first and second mounting blocks has a slot formed therein for receiving its respective pivot pin, said slot being open at one end, and said threaded fasteners are used to secure the pivot pin in said slot.

7. A retractable undercarriage for wheels for a large vehicle comprising:
a support member adapted for connection to a frame of said vehicle and having a vertically extending portion, an arm member pivotally connected at one end thereof to the lower end of said vertically extending portion;
means for mounting a set of dual wheels on the other end of said arm member, said mounting means including an axle arrangement;
a first mounting block rigidly attached to said support member and adapted to receive a first pivot pin;
a second mounting block rigidly attached to said arm member and spaced from said one end of the arm member and adapted to receive a second pivot pin;
hydraulic cylinder means for extending and retracting said undercarriage by pivoting said arm member, an upper end of said cylinder means being pivotally connected by said first pivot pin to said first mounting block and a lower end of said cylinder means being pivotally connected by said second pivot pin to said second mounting block, said first or second pivot pin being generally cylindrical except for two end sections of the pin that are flat on one side; and
threaded fasteners for securing at least one of said first and second pivot pins to its respective mounting block, wherein at least one of said first and second mounting blocks has a slot formed therein for receiving its respective pivot pin, said slot being open at one end, and said threaded fasteners are used to secure the pivot pin in said slot and one of said threaded fasteners engages the flat side of each end section in order to hold the pin in place.

8. A retractable undercarriage according to claim 6 wherein at least one of said first and second pivot pins have two bolt holes formed in opposite end sections thereof and extending diametrically of the pin and said threaded fasteners extend through respective bolt holes and the adjacent mounting block.

9. A retractable undercarriage according to claim 6, wherein said support member has a round, horizontal upper surface adapted for connection to a turntable support of said vehicle, said undercarriage permitting dual wheels mounted thereon to be steered.

10. A retractable undercarriage according to claim 6, wherein said first mounting block has said open-ended slot formed therein and said slot is inclined rearwardly and downwardly so that its open end faces towards said other end of said arm member and said wheel mounting means.

11. A retractable undercarriage for dual wheels of a large vehicle comprising:
a rigid support member adapted for connection to and support of a main frame of said vehicle and having a vertically extending leg;
an arm member pivotally connected at one end thereof to the lower end of said leg;
pin means pivotally connecting said arm member to said rigid support member, said pin means including a pin member extending through openings in both said support member and said arm member, an inner tubular member extending around a central section of said pin member, two spaced-apart inner bearing rings mounted on said tubular member and each having an outer surface that is convex in an axial cross-section, two spaced-apart outer bearing rings arranged around their respective inner bearings rings and each having an inner surface that is concave so as to form a mating bearing surface with the convex surface, and an outer tubular member in which said bearing rings and pin member are arranged, said outer tubular member being rigidly mounted in said one end of said arm member;
means for sealing off said bearing rings to protect them from dirt and other contaminants;
a running gear sub-assembly connected to and mounted on the other end of said arm member, said sub-assembly including an axle arrangement for mounting dual wheels; and
means for extending and retracting said undercarriage by pivoting said arm member relative to said support member.

12. A retractable undercarriage according to claim 11 wherein said pin means includes two adaptors arranged at opposite ends of said inner tubular member on said pin member, each adaptor fitting snugly in an opening formed in said rigid support member and being held in said opening by a nut threaded onto the adjacent end of said pin member.

13. A retractable undercarriage according to claim 12 wherein said support member has a round, horizontal upper surface adapted for connection to a turntable support of said vehicle, said undercarriage permitting dual wheels mounted thereon to be steered.

14. A retractable undercarriage according to claim 11, including a cylindrical spacer extending between said outer bearing rings and adapted to transfer loads from one outer bearing ring to the other outer bearing ring, said spacer being positioned radially outwardly from said inner tubular member.

15. A retractable undercarriage according to claim 14 wherein a pressure release valve is arranged in said outer tubular member to prevent undue buildup of pressure in said pin means during lubrication thereof.

16. A retractable undercarriage according to claim 14 wherein said sealing means comprises two seal rings mounted in opposite ends of said outer tubular member and extending around the perimeter of said inner tubular member.

17. A retractable undercarriage according to claim 14 wherein the lower end of said leg is bifurcated and each branch at said lower end has an opening to receive an outer end section of said pin member and wherein an elastomeric V-ring is fitted between the inside surface of each said branch and said sealing means, said V-ring extending about the exterior of an end of said inner tubular member.

18. An undercarriage for dual wheels of a vehicle comprising:

support means adapted for connection to and support of a main frame of said vehicle, said support means including an elongate frame member extending in use in the direction of travel of said vehicle;

two spaced-apart support brackets extending up from one end of said frame member and each having a hole formed therein;

pin means for pivotally connecting an axle arrangement for said dual wheels on said frame member, said pin means being supported at opposite ends thereof by said support brackets and including a pin member that extends through the holes in said brackets, an inner tubular member extending around a central section of said pin member, two spaced-apart inner bearing rings mounted on said tubular member and each having an outer surface that is convex in axial cross-section, two spaced-apart outer bearing rings arranged around their respective inner bearing rings and each having an inner surface that is concave and forms a mating bearing surface with said convex surface, and an outer tubular member in which said bearing rings and pin member are arranged, said axle arrangement being mounted on said outer tubular member; and means for sealing off said bearing rings to protect them from dirt and other contaminants.

19. A retractable undercarriage according to claim 18 including a cylindrical spacer extending between said outer bearing rings and adapted to transfer loads from one outer bearing ring to the other outer bearing ring, said spacer being positioned radially outwardly from said inner tubular member.

20. An undercarriage according to claim 18 wherein said undercarriage is retractable, said support means includes a rigid support member having a vertically extending leg, and said frame member is pivotally connected at one end thereof to the lower end of said leg.

21. A retractable undercarriage according to claim 2 wherein said bolt holes have smooth, unthreaded surfaces and said threaded fasteners comprise bolts and nuts threaded onto said bolts.

22. A retractable undercarriage according to claim 3 wherein said bolt holes have smooth, unthreaded surfaces and said threaded fasteners comprise bolts and nuts threaded onto said bolts.

23. A retractable undercarriage according to claim 8 wherein said bolt holes have smooth, unthreaded surfaces and said threaded fasteners comprise bolts and nuts threaded onto said bolts.

24. A retractable undercarriage according to claim 7 wherein the pivot pin with flat sided end sections has two unthreaded bolt holes formed in said end sections and extending diametrically of the pin and said threaded fasteners comprise bolts that extend through said bolt holes and nuts threaded onto said bolts.

* * * * *